(12) United States Patent
Goel et al.

(10) Patent No.: US 10,809,808 B2
(45) Date of Patent: Oct. 20, 2020

(54) GESTURE-CONTROLLED VIRTUAL REALITY SYSTEMS AND METHODS OF CONTROLLING THE SAME

(71) Applicant: Intel Corporation, Santa Clara, CA (US)

(72) Inventors: Manan Goel, Hillsboro, OR (US); Saurin Shah, Portland, OR (US); Lakshman Krishnamurthy, Portland, OR (US); Steven Xing, San Jose, CA (US); Matthew Pinner, Denver, CO (US); Kevin James Doucette, Los Angeles, CA (US)

(73) Assignee: Intel Corporation, Santa Clara, CA (US)

(*) Notice: Subject to any disclaimer, the term of this patent is extended or adjusted under 35 U.S.C. 154(b) by 133 days.

(21) Appl. No.: 15/388,079

(22) Filed: Dec. 22, 2016

(65) Prior Publication Data
US 2018/0107278 A1    Apr. 19, 2018

Related U.S. Application Data

(60) Provisional application No. 62/408,419, filed on Oct. 14, 2016.

(51) Int. Cl.
*G06F 3/01* (2006.01)
*G06K 9/00* (2006.01)
(Continued)

(52) U.S. Cl.
CPC .............. *G06F 3/017* (2013.01); *G06F 3/011* (2013.01); *G06F 3/014* (2013.01); *G06F 3/0304* (2013.01); *G06F 3/0426* (2013.01);
*G06F 3/162* (2013.01); *G06K 9/00335* (2013.01); *G10H 1/0008* (2013.01); *G10H 2220/101* (2013.01); *G10H 2220/201* (2013.01); *G10H 2220/391* (2013.01);
(Continued)

(58) Field of Classification Search
None
See application file for complete search history.

(56) References Cited

U.S. PATENT DOCUMENTS 9,830,894 B1 * 11/2017 Ma ............................ G10H 1/34
2013/0228062 A1 * 9/2013 Tabata .................. G10H 1/0008
84/602

(Continued)

OTHER PUBLICATIONS

Nintendo, www.nintendo.com/games/detail/Fe0_TFVoa6RbkoZq_GoIDaRTgOzVAOID, Promotional video under "Game info" (last accessed on Jul. 23, 2018).*

(Continued)

*Primary Examiner* — Brian M Butcher
(74) *Attorney, Agent, or Firm* — Hanley, Flight & Zimmerman, LLC

(57) ABSTRACT

Gesture-controlled virtual reality systems and methods of controlling the same are disclosed herein. An example apparatus includes at least two of an on-body sensor, an off-body sensor, and an RF local triangulation system to detect at least one of a position or a movement of a body part of a user relative to a virtual instrument. The example apparatus includes a processor to generate an audio output of the virtual instrument in response to the at least one of the position or the movement.

33 Claims, 5 Drawing Sheets

(51) Int. Cl.
*G06F 3/03* (2006.01)
*G10H 1/00* (2006.01)
*G06F 3/16* (2006.01)
*G06F 3/042* (2006.01)

(52) U.S. Cl.
CPC . *G10H 2220/395* (2013.01); *G10H 2220/401* (2013.01); *G10H 2220/425* (2013.01); *G10H 2220/455* (2013.01)

(56) References Cited

U.S. PATENT DOCUMENTS

| | | | | |
|---|---|---|---|---|
| 2013/0236869 | A1* | 9/2013 | Sakazaki | G09B 5/04 434/247 |
| 2013/0239782 | A1* | 9/2013 | Yoshihama | G10H 7/00 84/609 |
| 2013/0239784 | A1* | 9/2013 | Tabata | G10H 1/0008 84/609 |
| 2013/0239785 | A1* | 9/2013 | Tabata | G10H 1/0008 84/609 |
| 2014/0225931 | A1* | 8/2014 | Plagemann | G06T 3/40 345/660 |
| 2015/0143976 | A1* | 5/2015 | Katto | G10H 7/00 84/602 |
| 2015/0358543 | A1* | 12/2015 | Kord | G06F 3/014 345/474 |
| 2016/0203806 | A1* | 7/2016 | Hardi | G10D 13/12 84/600 |
| 2017/0330539 | A1* | 11/2017 | Little | G10H 1/386 |

OTHER PUBLICATIONS

Harbuz, Antoni, "Our Sensors Have Grown Up and Are Doing Amazing Things by Themselves", Aug. 25, 2016, available at https://stretchsense.com/articles-resources/blog/wearable-technology/our-sensors-have-grown-up-and-are-doing-amazing-things-by-themselves/ (last accessed Dec. 21, 2016), 3 pages.

Harbuz, Antoni, "Our Sensors Have Grown Up and Are Doing Amazing Things by Themselves", Aug. 25, 2016, available at http://blog.stretchsense.com/engineering/stretchsense-gloves (last accessed Dec. 21, 2016), 6 pages.

StretchSense, "Jai Ho!", Jan. 13, 2016, available at http://blog.stretchsense.com/engineering/jai-ho-2 (last accessed Dec. 21, 2016), 7 pages.

Morton, Jamie, "Mitten Impossible: Kiwis Nail VR Glove," Jan. 8, 2016, available at http://www.nzherald.co.nz/technology/news/article.cfm?c_id=5&objectid=11570618 (last accessed Dec. 21, 2016), 2 pages.

New Zealand Trade & Enterprise, "New Zealand Company StretchSense Opens CES 2016 Playing Air Guitar . . . Using Virtual Reality," Jan. 7, 2016, available at https://www.nzte.govt.nz/en/news-and-media/new-zealand-company-stretchsense-opens-ces-2016-playing-air-guitarusing-virtual-reality/ (last accessed Dec. 21, 2016), 3 pages.

* cited by examiner

GESTURE-CONTROLLED VIRTUAL REALITY SYSTEMS AND METHODS OF CONTROLLING THE SAME

RELATED APPLICATION

This patent claims the benefit of, and priority to, U.S. Provisional Patent Application Ser. No. 62/408,419, entitled "Gesture-Controlled Virtual Reality Systems and Method of Controlling the Same" and filed on Oct. 14, 2016. U.S. Provisional Patent Application Ser. No. 62/408,419 is hereby incorporated herein by reference in its entirety.

FIELD OF THE DISCLOSURE

This disclosure relates generally to virtual reality, and, more particularly, to gesture: controlled virtual reality systems and methods of controlling the same.

BACKGROUND

A virtual reality (VR) environment is a digital representation of an environment (e.g., a real or imaginary environment). A VR environment can include audio content and/or visual content. The VR environment can be displayed in any number of ways, for example, via a computer monitor, a virtual reality head-mounted device, speakers, etc. Some VR environments simulate a user's presence in the environment such that the user can interact with the virtual reality environment. For example, a hand movement such as a user gesture indicative of picking up an object can be reflected in the VR environment by movement of a corresponding simulated object.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
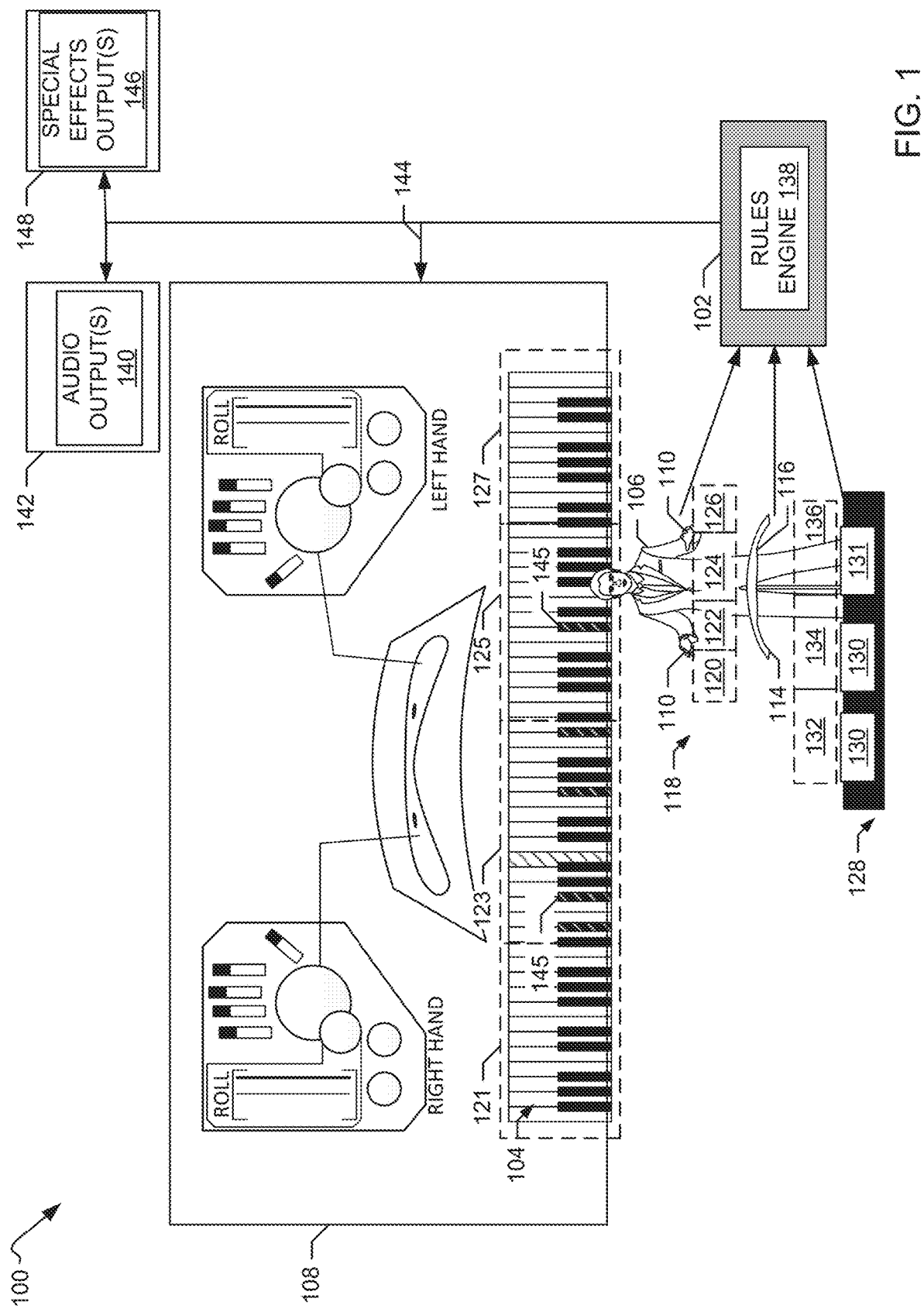
FIG. 1 illustrates an example system constructed in accordance with the teachings disclosed herein.

A virtual reality (VR) environment is a digital representation of an environment (e.g., a real or imaginary environment). A VR environment can include audio content and/or visual content. The VR environment can be displayed in any number of ways, for example, via a computer monitor, a virtual reality head-mounted device, speakers, etc. Some VR environments simulate a user's presence in the environment such that the user can interact with the virtual reality environment. For example, a hand movement such as a user gesture indicative of picking up an object can be reflected in the VR environment by movement of a corresponding simulated object.

Gesture recognition generally involves tracking position and/or movement of one or more body parts. For example, a position of a user's hand and/or maneuvers such as rotation of the hand and/or bending of one or more fingers of the hand may be monitored to identify a desired gesture.

A camera can be used to track body part movements. Image data collected by the camera can be processed by a processor in communication with the camera to recognize body part (e.g., hand) position, generate 3-D representations of the body part (e.g., a hand), and/or generate machine executable instructions based on detected gestures (e.g., an instruction to enable selection of a virtual object displayed via a user interface).

Although a camera may be used for gesture recognition, use of a camera may introduce latency into processing and recognizing the gestures due to, for example, limitations with respect to frame rates (e.g., a number of frames that the camera can capture in a period of time, such as frames per second) and/or processing speeds for processing the images collected by the camera. A camera may also have limited ability to detect subtle body motions, such as a slight bend of a finger or slight rotation of a hand.

Wearable sensors include one or more motion sensors mounted to, worn by, and/or carried on one or more body parts to detect motion of a corresponding portion of the user's body. For example, a glove worn on a hand of a user can includes sensors such as flex sensor(s) to detect bending or flexing of the hand and/or fingers and/or an accelerometer to detect motion of the hand. Data collected by the sensors of the glove can be wirelessly transmitted to a processor for tracking hand motion.

Example systems and methods disclosed herein obtain real world position data reflecting real world physical position(s) of one or more body parts of a user, such as the user's hands, feet, etc. and translate the real world position data into virtual position data relative to one or more virtual objects, such as a virtual musical instrument (e.g., a virtual piano, organ, marimba, or synthesizer). The real world physical position data is obtained via one or more position-detecting device(s), such as a camera, an RF based local triangulation system, and/or wearable sensor(s). In examples disclosed herein, granular physical position and/or movement data such as flex or bend data is collected from wearable sensor(s), such as glove worn by the user. In some examples, the wearable sensor(s) includes one or more ultra-wideband (UWB) radio(s) that cooperate with UMB receivers) to implement the RF based local triangulation system. In particular, UWB radio(s) worn or otherwise carried by the user transmit radio signal(s) to UWB radio receiver(s) located in the physical environment. By detecting, for example, the time(s) it takes for the radio signal(s) to reach the transmitter(s) (and/or difference(s) therebetween), one or more processor(s) associated with the UWB radio receivers) can, for example, triangulate the position(s) of the UWB transmitter(s) to determine physical position and/or movement data corresponding to one or more parts of the user's body. In some such examples, the camera additionally or alternatively secures images and/or video of the user and/or the user's body parts to provide visual data that reflects real world physical position(s) and/or movement(s) of body part(s). Based on the physical position data obtained from the position-detecting device(s), examples disclosed herein generate one or more audio and/or visual outputs that are reflected in the virtual environment.

Examples disclosed herein combine the real world position data collected by the wearable sensor(s), the UWB radio(s)/receivers and/or the camera(s) to achieve highly granular gesture recognition as compared to, for example, use of a camera alone, use of a wearable sensor alone, etc. The real world position data detected by multiple position-detecting devices provides for improved resolution in interpreting the gestures of the user. Due to the improved granularity in the interpretation of the user gestures, examples disclosed herein are able to detect fine, detailed movements and generate one or more instructions to generate one or more audio and/or visual outputs that achieve similarly fine detailed effects in the virtual environment. In some such examples, the effects are sufficiently granular to effectively simulate playing of a musical instrument or other activity requiring fine motor skills.

In examples disclosed herein, one or more virtual musical instruments are played by a user via hand gestures that mimic playing a real world (i.e., non-virtual) musical instrument. An example VR environment disclosed herein includes one or more virtual musical instruments, such as a piano, organ, marimba, synthesizer and/or a drum. One or position-detecting devices, such as an off body camera (i.e., a camera not mounted or otherwise carried by the user being monitored), a wearable sensor, and/or a UWB radio local position monitoring system, detect position(s) and/or movement(s) of the user's hands relative to the virtual musical instrument(s) The captured position data can be used to determine, for example, the location(s) and/or movement(s) (e.g., direction, acceleration, deceleration, force applied, etc.) of, for instance, the user's hand relative to a keyboard of a virtual piano. In examples disclosed herein, sensor-enabled wearable(s) such as gloves collect data about, for example, bending of the user's fingers. The bending of the user's fingers can represent, for example, a musical note that the user intends to play via the keyboard of the virtual piano.

Based on the data collected by the position-detecting device(s), examples disclosed herein determine which musical note the user intends to play (e.g., based on the location and/or movement(s) of the user's hand/fingers and/or feet relative to the virtual instrument (e.g., piano)). If more than one virtual instrument is present in the virtual environment, examples disclosed herein first determine which virtual instrument a user intends to play (e.g., a virtual piano or a virtual drum).

Examples disclosed herein map the sensed/collected position data to one more locations on the virtual musical instrument based on one or more rules. Some examples disclosed herein generate an audio output corresponding to the musical instrument being played virtually by the user in substantially real-time. In some examples, a data stream is generated based on the position data that is further processed by music software (e.g., software such as Live™, Push and/or Link™, which are commercially available from Ableton AG) to generate the audio output.

Some such examples may be used to generate new virtual musical instruments that do not exist in the physical world by combining aspects of multiple musical instruments in one virtual instrument, such as a piano and a cello, thereby facilitating the creation of different musical compositions. In some examples, the virtual instrument may be used to provide a hybrid musical performance by being played simultaneously as a physical (e.g., non-virtual) musical instrument is played. For example, a user playing a guitar can wear a sensor-instrumented glove on his hand. The sensor data collected by the sensors of the glove can be used to add audio effects, filtering, etc. to the audio produced by the user strumming the guitar. Some examples disclosed herein generate a visual output such as a digital representation of a portion of a keyboard of a piano being played by the user and/or effects such as lighting effects to accompany the audio output.

Although examples disclosed herein are discussed in the context of virtual musical instruments, examples disclosed herein can be utilized in other applications, such as gaming applications, sports applications (e.g., virtual baseball), medical rehabilitation of patients such as stroke patients, etc. As such, the discussion of virtual music instruments is for illustrative purposes only and does not limit this disclosure to musical applications.

FIG. 1 illustrates an example gesture-controlled virtual reality system 100 constructed in accordance with the teachings of this disclosure. The example system 100 of FIG. 1 generates one or more audio and/or visual outputs based on user interaction with a virtual reality (VR) environment. As explained in detail below, the example system 100 of FIG. 1 includes position-detecting device(s) (e.g., on-body sensors, off-body sensors, an RF triangulation system to track user movement(s), etc.) and a VR processor 102. The VR processor 102 of the illustrated example generates a VR environment including virtual content. In the example of FIG. 1, the virtual content includes one or more virtual musical instruments 104 to be played by a user 106 via one or more gestures. As such, the musical instrument is virtual and is played without any real world physical contact between the user and the instrument. The VR environment can include other virtual content in addition to or different from the virtual musical instrument(s) 104. For example, the virtual content can include other instruments or other content unrelated to a musical application (e.g., a virtual baseball bat that is to be swung by the user via a swinging gesture).

In the example system 100 of FIG. 1, a visualization presenter 108 (e.g., a display screen) displays a digital representation of the virtual musical instrument(s) 104 based on one or more instructions from the VR processor 102. For example, as illustrated in FIG. 1, the virtual musical instrument 104 includes a piano keyboard that is displayed via the presenter 108. In other examples, the virtual musical instrument(s) 104 and/or other virtual content are not displayed. The example of FIG. 1 is representative of a performance in which a musician is playing the virtual instrument 104 and the visualization presenter 108 is displaying the interaction with the virtual instrument and movement of the musician's hands. In this example, the visualization presenter 108 is positioned behind the musician for display to an audience in front of the musician.

The example system 100 of FIG. 1 includes position-detecting device(s) to receive data indicative of position and/or movement of one or more body parts of the user. In this example, the position-detecting device include one or more sensor-enhanced wearables 110 (hereinafter interchangeably referred to as "wearable(s)" or "on-body sensors") to be worn by the user 106. In this example, the on-body sensors 110 include gloves worn by the user 106 on each of the user's hands. In other examples, the user 106 wears the wearable 110 only on one hand. In some examples, the wearables 110 include one or more sensor-enhanced bands (e.g., ankle bands) worn by the user 106 about at least one of his ankles or feet. The wearables 110 include one or more sensors, such as a bend sensor(s), accelerometer(s), vibration sensor(s), gravitational sensor(s), force sensor(s), etc. and are positioned to develop signals representative of movement(s) and/or position(s) of a body part on which the sensor is mounted.

In the example system 100, the user 106 moves body parts (e.g., their hands) as if the user 106 were playing one or more physical instruments corresponding to the virtual musical instrument(s) 104. For example, the user 106 may move his/her fingers as if his/her fingers were pressing the keys of the piano keyboard of the virtual musical instrument 104 of the VR environment of FIG. 1, but without actually physically touching a physical keyboard. As another example, the user 106 may bend his/her hand or tap his/her foot as if he/she were tapping on a drum, but without actually physically touching a physical drum. As the user 106 moves his/her arm(s), wrist(s), hand(s), feet, and/or finger(s), the sensors of the wearables 110 output data representative of the movements of the user 106. For example, the wearables 110 can include a bend sensor such that when the user 106 bends one of his fingers, a capacitance of the sensor changes. When the change in capacitance passes a predefined threshold, the sensor generates a signal indicating that the user 106 has bent his finger. In examples where the user 106 wears one or more on-body sensor(s) 110 about the user's ankle(s) and/or feet, sensors) of the wearable(s) 110 can detect a change in an angle of the foot of the user 106 (e.g., as if the user were pressing pedals of a drum set).

In the example system 100 illustrated in FIG. 1, a wearable 110 includes a wearable processor to process the data collected by the sensors, as will be discussed further below in connection FIG. 2. In some examples, each wearable 110 includes a dedicated processor. In others, a processor is provided on a subset of the wearables (e.g., one of the wearables) and data collected on the other wearables is conveyed to the subset with the processor(s) via, for example, wired or wireless (e.g., near field, Bluetooth, etc.) communication. The wearable processor(s) process the data collected by the sensors to identify one or more corresponding gestures and wirelessly transmit the gesture data to the VR processor 102 of the example system 100. In some examples, some or all of the data from e wearable(s) 110 is transmitted to the VR processor 102 via a wired connection. In some examples, the gesture identification processing is not performed on the wearable 110, but instead is performed by the VR processor 102. In some such examples, none of the wearables 110 include a processor.

In the example system 100 of FIG. 1, some of the position-detecting device(s) are implemented by a first camera 114 and a second camera 116 which operate as off-body sensors to develop position and/or movement data. Some examples include fewer or more (e.g., 1, 3, 4, 0, etc.) camera(s). In the example of FIG. 1, the camera(s) 114, 116 collectively generate a collective or aggregate field of view 118 for capturing one or more images (e.g., video) of the hands (and/or other body parts which may or may not include wearable(s) 110) of the user 106. The aggregate field of view 118 can be thought of as an aggregation of the individual fields of view of the cameras 114, 116. The individual fields of view may or may not overlap. In the example system 100 of FIG. 1, the aggregate field of view 118 is divided into two or more zones. In the example of FIG. 1, the aggregate field of view 118 includes a first zone 120, a second zone 122, a third zone 124, and a fourth zone 126. The first and second cameras 114, 116 capture images of the zones 120, 122, 124, 126, which are used to generate position data with respect to position(s) of the hand(s) of the user 106 relative to the zones 120, 122, 124, 126. In the example of FIG. 1, the zones 120, 122, 124, 126 represent a 3-dimensional (3-D) space having X, Y, and Z dimensions. The collective field of view 118 can include additional or fewer zones (e.g., as a result of a larger field of view 118 created by additional cameras, by dividing the field of view 118 into additional or fewer zones, etc.). In the example of FIG. 1, the cameras are mounted on a bench or generally horizontal bar near the knees of the user and point upward toward the user's face. However, the position, size, etc. of the first and/or second cameras 114, 116 can differ from the examples illustrated in FIG. 1.

In the example system 100 shown in FIG. 1, the zones 120, 122, 124, 126 correspond to positions of the hands of the user with respect to one or more virtual instruments. For example, as illustrated in FIG. 1, the first zone 120 corresponds to a first portion 121 of the keyboard of the virtual musical instrument 104. In this example, the first portion 121 of the keyboard corresponds to a first number of keys proximate to a ride side of the keyboard. The second zone 122 of this example corresponds to a second portion 123 of the keyboard of the virtual musical instrument 104 (e.g., a second number of keys proximate to a right middle of the keyboard). The third zone 124 corresponds to a third portion 125 of the keyboard of the virtual musical instrument 104 (e.g., to a left middle set of the keys of the keyboard). The fourth zone 126 corresponds to a fourth portion 127 of the keyboard of the virtual musical instrument 104 (e.g., to a left side of the keyboard). In other examples, the zones 120, 122, 124, 126 are defined based on other criteria. For example, the field of view 118 of the cameras 114, 116 can be divided into squares, where each square includes at least a portion of one virtual instrument. In such examples, when the right hand of the user 106 is in the first zone 120, the position of the right hand may be identified as positioned to interact with a first drum of a drum set, whereas when the left hand of the user 106 is in the fourth zone 126, the position of the left hand may be identified as positioned to interact with a cymbal of the drum set.

As the user 106 moves one or more of his/her hands within the field of view 118 of the first and second cameras 114, 116, the first and second cameras 114, 116 track the position(s) of the user's hand(s) in substantially real-time. For example, the first camera 114 can track a position of the right hand of the user 106 relative to the first zone 120 and the second zone 122 and the second camera 116 can track a position of the left hand of the user 106 relative to the third zone 124 and the fourth zone 126. Other allocations of zones to cameras can be utilized. For instance, in some examples, each of the first and second cameras 114, 116 track the position of the right and/or left hands in the first through fourth zones 120, 122, 124, 126. The first and second cameras 114, 116 generate one or more images of the user's hand(s) When the user's hand(s) are in their respective individual fields of view. The images can be generated substantially continuously while the user's hands are in the field of view 118 or at predefined intervals.

The first and second cameras 114, 116 of the example system 100 can also measure depth with respect to a distance of the hand(s) of the user 106 from the camera(s) 114, 116 (e.g., via projection of an infrared light). The images generated by the first and second cameras 114, 116 can include three-dimensional representations of the respective hands of the user 106. In the example of FIG. 1, the cameras are implemented by RealSense™ cameras which are commercially available from Intel® Corporation.

In the example system 100 of FIG. 1, the images captured by the first and second cameras 114, 116 are wirelessly transmitted to the VR processor 102. In other examples, the images are transmitted to the VR processor 102 via a wired connection. As will be disclosed below, the VR processor 102 determines in which (if any) of the zones 120, 122, 124, 126 each of the user's hands are located in substantially real-time based on the images captured by the first and second cameras 114, 116. The VR processor 102 determines the respective zone(s) in which the hand(s) of the user 106 are located and maps the position of each of the user's hands (when present) relative to the virtual musical instrument 104 of the VR environment 102.

In the example system 100 of FIG. 1, some of the position-detecting device(s) are implemented by an RF position triangulation system. In this example, the RF triangulation system includes an ultra-wideband (UWB) radio platform 128 and UWB transmitters mounted to the user as on-body sensors. The UWB radio platform 8 is not carried by the user, but instead receives RF signals from the on-body UWB transmitters to develop position data with respect to the user's hands and/or other body parts e.g., ankles) on which the UWB transmitters are mounted as wearable(s) 110. The position data developed by the UWB platform can be employed in addition to or as an alternative to the position data generated by the first and second cameras 114, 116 and/or the other wearables 110. The UWB radio platform 128 can be, for example, implemented as one or more radio receivers 130 to receive signal data from the UWB transmitters. The receivers 130 may be mounted on (e.g., beneath) a stage on which the user 106 stands and moves around while playing the virtual instrument(s) 104. In examples where the UWB radio platform 128 is used for position tracking, the wearable(s) 110 include one or more UWB transmitters.

The UWB radio platform 128 of the illustrated example is divided into two or more zones. For example the UWB radio platform 128 of the example of FIG. 1 is divided into a first UWB zone 132, a second UWB zone 134, and a third UWB zone 136. The zones 132, 134, 136 of this example are associated with positions of the virtual musical instrument(s) 104 and/or respective portion(s) thereof (e.g., similar to the zones 120, 122, 124, 126 of the field of view 118 of the first and second cameras 114, 116). The UWB radio platform 128 can be divided into additional or fewer UWB zones. Based on signal data transmitted by the UWB transmitters of the wearable(s) 110 and received by the radio receiver(s) 130, a UWB radio platform processor 131 determines respective position(s) of the body part(s) carrying UWB transmitters (e.g., the hands of the user 106) relative to the zones of the UWB radio platform 128. The UWB radio platform processor 131 wirelessly transmits the position data to the VR processor 102. In other examples, the data from the radio receiver(s) 130 is transmitted to the VR processor 102 via a wired connection. In still other examples, the VR processor 102 implements the UWB processor 131, thereby eliminating the need for separate processors and reducing costs.

The VR processor 102 of the example system 100 of FIG. 1 includes a rules engine 138. The rules engine 138 analyzes the position and movement data obtained from e off-body sensor(s) 114, 116 and/or the on-body sensors 110 (e.g., via the UWB radio platform processor 131) to generate one or more audio outputs, visual outputs, and/or special effect outputs associated with the virtual musical instrument(s) 104. The rules engine 138 of this example determines which musical notes the user 106 intends to play based on the position data (e.g., movement data and/or gesture data), and/or one or more rules. The rules engine 138 of this example generates data that is processed by, for example, music software, to produce an audio output 140 corresponding to the musical notes that the user 106 intends to play. The audio output 140 can be played via one or more audio players 142 (e.g., speakers) of the example system 100. In some examples, the rules engine 138 analyzes the position data reflecting the velocity of movement, acceleration and/or the depth of the hand(s) of the user 106 (e.g., as collected by the first and/or second cameras 114, 116) relative to the virtual instrument(s) 104 to determine, for example, a volume level at which the user 106 wishes to play the music based on one or more rules (e.g., the farther one or more of the user's hands are from the cameras 114, 116, the louder the volume). The volume level can be included in the audio output(s) 140.

The rules engine 138 of this example also generates visual data in order to display a visualization of the virtual musical instrument(s) 104 being played by the user 106. For example, as disclosed above, the example system 100 includes the visualization presenter 108 to display a digital representation of the virtual musical instrument 104. In the example system 100 of FIG. 1, the rules engine 138 generates one or more instructions for presenter 108 to display one or more visual images 144 corresponding to, for example, the keys of the virtual musical instrument 104 that are being played by the user 106 based on the position data (e.g., the gesture data). The visual display of the virtual musical instrument 104 can provide feedback to the user 106 and/or, for example, to audience members in substantially real-time with respect to the orientation of the user's hands relative to the keys of the virtual musical instrument 104, what keys the user 106 is playing, etc. In the example of FIG. 1 the keys 145 of the virtual musical instrument 104 being played are highlighted via the presenter 108.

In some examples, the rules engine 138 generates special effects data to generate one or more special effects outputs 146, such as lighting effects or other stage effects (e.g., smoke). The special effects outputs 146 can be based on, for example, the audio output(s) 140 and/or the visual output(s) 144. The special effects output(s) 146 can be presented by one or more special effect presenters 148 (e.g., lights).

Thus, the example system 100 combines the gesture and/or movement data (collectively position data) generated via the sensor-enabled wearable(s) 110 and gesture and/or movement data (collectively position data) obtained via the first and second cameras 114, 116 and/or the UWB radio platform 128 to generate one or more audio and/or visual outputs based on the interaction of the user 106 with the example system 100. In some examples, the position data collected by the cameras 114, 116 and/or the UWB platform provides macro-level position information identifying when tracked body parts are in certain zones (e.g., are engaging certain portions of an instrument 104 such as a section of keys) and the wearable sensor(s) 110 such as gloves provide relatively more granular position information to identify locations within the portions of the instrument 104 (e.g., a specific key) that is being engaged. As such, the example system 100 of FIG. 1 facilitates a musical performance based on the interaction of the user 106 with the virtual musical instrument(s) 104.

Figure 2:
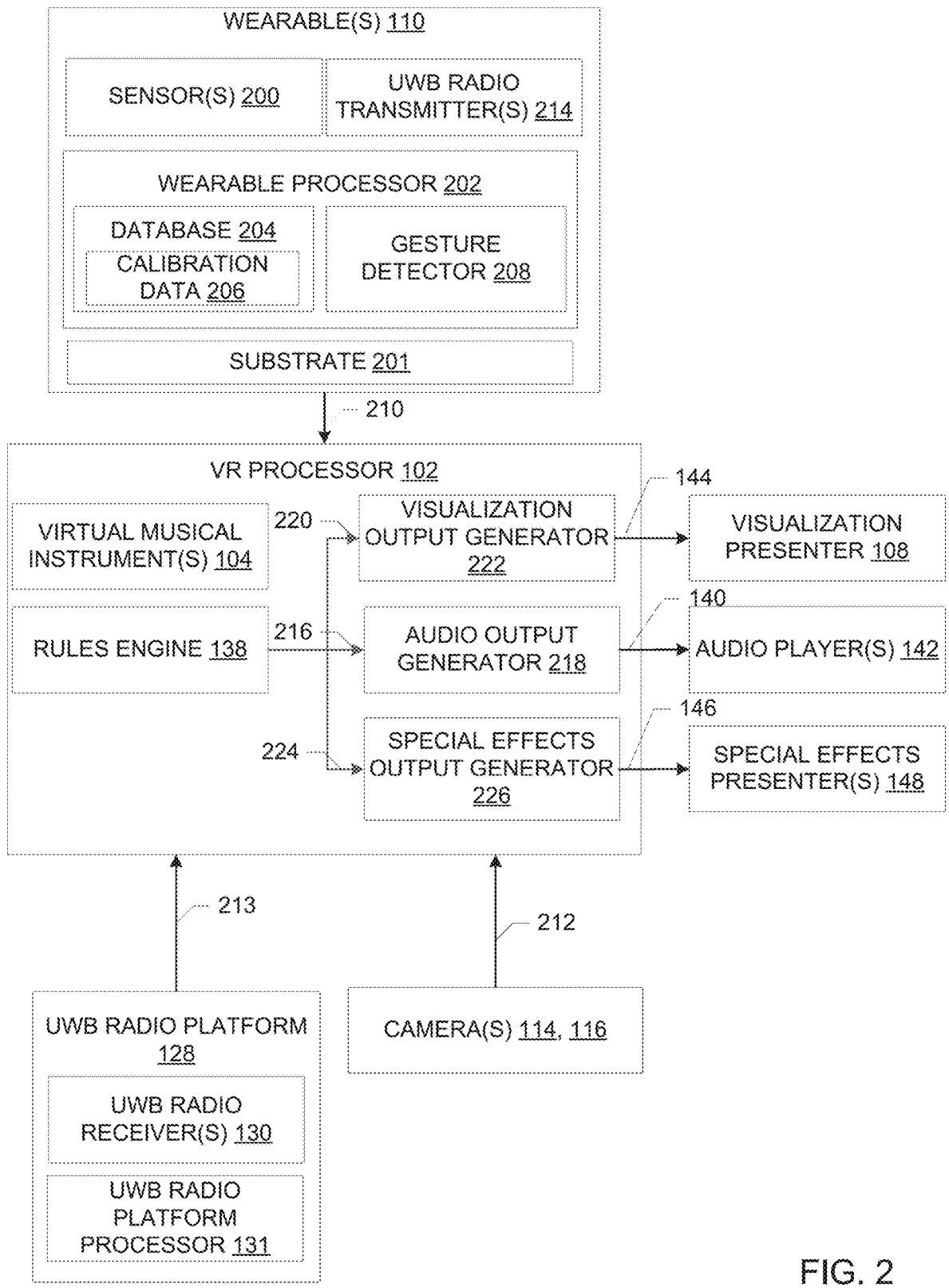
FIG. 2 is a block diagram of an example implementation of the example system of FIG. 1.

FIG. 2 is a block diagram of an example implementation of the example system 100 of FIG. 1. In the example of FIG. 2, the virtual musical instrument(s) 104 are stored as virtual content data in the VR processor 102. As the user 106 interacts with the virtual musical instrument(s) 104, the VR processor 102 receives and analyzes data to interpret the gestures of the hands and/or other body parts of the user 106 based on position data received from the wearable(s) 110, the cameras 114, 116, and/or the UWB radio platform 128.

As disclosed above in connection with FIG. 1, the user 106 wears at least one wearable 110 while interacting with the virtual musical instrument(s) 104. For example, the user 106 of the example system 100 wears a first wearable glove 110 on his right hand and a second wearable glove 110 on his left hand. In other examples, the user 106 only wears the wearable 110 on one hand. In some examples, the user 106 additionally or alternatively wears one or more wearables 110 on other body parts e.g., ankles).

An example implementation of a wearable 110 is shown in FIG. 2. It will be understood that other wearables 110 can include similar or different components, depending on the application. The example wearable 110 of FIG. 2 includes a substrate 201 such as a fabric band or glove dimensioned to fit on a body part. In the illustrated example, an Intel® Curie™ Module is mounted to the substrate 201. The Curie™ Module sold by Intel® Corporation is a low power hardware module designed specifically for wearable applications. The Curie™ Module includes a processor 202 in the form of a microcontroller, flash and SRAM memory, motion sensors and Bluetooth communication capability. The Curie™ Module can be coupled to the substrate 201 in any desired fashion such as by a mechanical fastener (snaps, zipper, etc.), a chemical fastener (e.g., glue), and/or by insertion in a pocket of the substrate 201.

One or more sensors 200 are carried by the substrate of the wearable 110. The sensor(s) 200 can be implemented as, for example, bend sensors to detect bending or flexing (e.g., of one or more fingers or other body parts), accelerometers, gravity sensors, force sensors (e.g., for detecting forces exerted by a corresponding body pail such as at the user's fingertips), angular position sensors (e.g., for detecting an angle and/or angular velocity of the user's wrist and/or arm), etc. The sensor(s) 200 can detect a center of mass of the user's body parts associated with the wearable 110. The sensor(s) 200 can include other type(s) and/or number(s) of sensors coupled to the wearable 110. For example, the sensor(s) can be implemented by the motion sensors provided in the Curie™ Module. The sensor(s) can be coupled to the substrate 201 in any desired fashion such as by a mechanical fastener (snaps, zipper, etc.), a chemical fastener (e.g., glue), and/or by insertion in a pocket of the substrate 201.

The example wearable 110 of FIG. 2 includes a processor 202 such as microcontroller provided in the Curie™ Module. The processor 202 stores the data collected by the sensor(s) 200 in a database 204. The database 204 of the example processor 202 of FIG. 2 also stores calibration data 206 with respect to known gestures and/or known gesture patterns associated with the user 106 and/or other users. For example, the calibration data 206 can indicate that if the user's wrist angle moves between a first angular position and a second angular position, the user 106 is waving his hand. In some such examples, the calibration data 206 includes data corresponding to gestures typically performed in the context of the virtual content generated by the VR processor 102 of the example system 100. For example, the calibration data 206 can include gestures typically performed by a user when playing musical instruments, such as finger bending or tapping. The calibration data 206 can be stored in the database 204 via, for example, one or more user inputs received by the processor 202 or collected by the sensor(s) 200 of the wearable 110. Although the database is shown as being onboard the processor 202 in the example of FIG. 2, it can instead be off chip in a memory device such as a non-volatile RAM. For instance, the database can be implemented by the flash memory or the SRAM memory of the Curie™ Module.

The processor 202 of the example wearable 110 shown in FIG. 2 implements a gesture detector 208. Based on the data measured by the sensor(s) 200 during movement of, for example, the wearable 110, and the calibration data 206, the gesture detector 208 determines or deduces one or more gestures being performed by the user 106. For example, the gesture detector 208 associated with the wearable 110 worn on the user's right hand compares data measured by the bend sensors to known finger flex data to determine whether the user is bending one of his fingers on his right hand. As another example, the gesture detector 208 compares data regarding an angular position of one of the user's fingers to known finger angle data to determine whether the user is tapping his finger. The gesture detector 208 can identify, for example, if the sensor data is associated with a user's right or left hand. In some examples, the gesture detector 208 recognizes patterns between the data collected by the sensor(s) 200 and the calibration data 206 to determine or deduce the gestures) being performed by the user. Thus, the gesture detector 208 translates the data collected by the sensor(s) 200 into intended actions by the user 106.

As noted above, in some examples, the calibration data 206 includes known gesture data related to the VR content, such as gestures typically performed while playing musical instruments. In such examples, when the gesture detector 208 analyzes the data collected by the sensor(s) 200, the gesture detector 208 recognizes that, for example, tapping a finger or bending a wrist are gestures associated with playing a musical instrument (e.g., a drum, a piano, etc.). As a result, the gesture detector 208 is more likely to interpret the sensor data as indicating user intent to tap a finger or bend a wrist (as compared to interpreting the sensor data as indicative of a gesture unrelated to playing a musical instrument, such as gestures typically associated with drawing). Thus, the recognition of intended gestures based on the context of the virtual content increases the efficiency of the processor 202 in identifying relevant gestures by the user with respect to the virtual content.

The processor 202 transmits gesture data 210 generated by the gesture detector 208 to the VR processor 102 (e.g., via wireless transmission). The gesture data 210 includes, for example, data identifying the gestures determined or deduced by the gesture detector 208 based on the sensor data and the calibration data 206. Thus, in the example system 100 of FIG. 1, the VR processor 102 receives pre-processed gesture data 210, rather than raw sensor data, for efficient data transfer.

In the example system 100 of FIG. 2, the first and second cameras 114, 116 capture image data 212 from which position(s) of the user's hand(s) (when in the field of view 118) may be identified (e.g., as the user 106 is interacting with the virtual musical instrument(s) 104). For example, the first and second cameras 114, 116 capture image(s) of the hands of the user 106 as the user 106 moves his hands within the field of view 118 of the cameras 114, 116. As an example, when the virtual music instrument 104 is a piano, the first and second cameras 114, 116 capture images of the right and left hands of the user 106 as the user 106 moves his hands to mimic playing a real world (e.g., non-virtual) piano keyboard. The first and second cameras 114, 116 can also measure a distance of the hands of the user 106 from the cameras 114, 116 to generate depth data. The image data and the depth data 212 are transmitted to the VR processor 102 via wireless transmission).

In some examples, position data 213 is obtained from the UWB radio platform processor 131 of the UWB radio platform 128. In examples where system 100 includes the UWB radio platform 128, the wearable(s) 110 include one or more UWB radio transmitters 214. The UWB radio transmitter(s) 214 transmit RF signals that are received by one or more UWB radio receivers 130 of the UWB radio platform 128. For example, the UWB radio transmitters) 214 cyclically transmit RF signals containing an identifier of the transmitter and a timestamp reflecting a time of transmission periodic intervals) as the user 106 moves his hands to mimic playing one or more physical musical instruments corresponding to the virtual musical instruments 104. The UWB radio platform processor 131 calculates the positions of the respective hands of the user 106 based on the signal data received by the UWB radio receivers 130. For example, the UWB radio platform processor 131 can calculate the time it takes for the RF signal to reach each of several receivers 130 based on the timestamp and a time of receipt. Based on the signal travel times (or differences therebetween), the UWB radio platform processor 131 can identify the location of the transmitter that sent the RF signal using a triangulation approach. Because the identifier of the transmitter 214 is contained in the RF signal, the UWB radio platform processor 131 can compare the time travels of the same signal when multiple transmitters 214 are present. The position data 213 calculated by the UWB radio platform processor 131 is transmitted to the VR processor 102 (e.g., via wireless transmission).

In the example of FIG. 2, the rules engine 138 analyzes the gesture data 210, the image data 212, and/or the UWB position data 213 received by the VR processor 202. Based on this data 210, 212, 213, the rules engine 138 determines the respective zone (e.g. the example zones 120, 122, 124, 126 associated with the field of view 118 of the cameras 114, 116 or the example zones 132, 134, 136 associated with the UWB radio platform 128) in which the user's hands (and/or other body parts) are located in substantially real-time. For example, the rules engine 138 may determine that the user's right hand is in the first zone 120 of the field of view 118 of the first and second cameras 114, 116 at a first time and in the second zone 122 at a second time based on a change in the position of the user's right hand as detected from the images obtained by the cameras 114, 116. The rules engine 138 can determine that the user's right hand has moved from the first zone 120 to the second zone 122 based on a change in a position of the right hand relative to the field of view 118 (e.g., where the first zone 120 covers, for example, 0°-45° of the field of view 118 and the second zone 122 covers, for example, 45°-90° of the field of view 118). The rules engine 138 can determine the position of the user's hand relative to one or more of the X, Y, or Z dimensions of an X-Y-Z plane of any of the zones 120, 122, 124, 126.

In some examples, the first and second cameras 114, 116 and/or the UWB radio platform 128 include respective processors to identify the zones based on the image data 212 and/or the UWE position data 213 (e.g., the UWB radio platform processor 131). In such examples, the first and second cameras 114, 116 and/or the UWB radio platform 128 transmit zone identifying data to the VR processor 102 rather than or in addition to the image data 212 and/or the UWB position data 213. Thus, in some examples, pre-processed position data is transmitted to the VR processor 102.

The rules engine 138 of the example of FIG. 2 identifies which portion of the virtual musical instrument(s) 104 the user 106 is playing when the user's hands (and/or other body parts) are in the respective zones. For example, if the rules engine 138 determines that the user's right hand is located in the second zone 122 of FIG. 1, the rules engine 138 determines that the user 106 intends to play the second portion 123 of the virtual musical instrument 104, as illustrated in FIG. 1. The rules engine 138 determines which virtual musical instrument 104 the user 106 intends to play and/or which portion of the virtual musical instrument the user 106 intends to play based on identification of the position(s) of the user's hands and/or other body parts relative to the zone(s).

In the example system 100, each zone 120, 122, 124, 126, 132, 134, 136 can be associated with a plurality of musical notes that can be played by the user 106 when one or more of the user's hands are positioned in the zone. For example, when the virtual musical instrument 104 is a piano, each of the first through fourth zones 120, 122, 124, 126 associated with the camera field of view 118 can provide ten musical notes to be played by the user 106 when the user's hand(s) are positioned in the zone (e.g., corresponding to the user's ten fingers). Thus, the example first through fourth zones 120, 122, 124, 126 enable forty notes to be played by the user 106 via the virtual musical instrument 104 (e.g., four zones, up to ten fingers that can be positioned in each zone). Additional or fewer musical notes can be played based on the number of zones into which the field of view 118 (or the UWB radio platform 128) is divided.

In the example system 100 of FIG. 1, the example rules engine 138 analyzes the gesture data 210 to determine which musical notes the user 106 intends to play. For example, if the gesture data 210 indicates that the user 106 is bending his pointer finger on his tight hand (e.g., based on data collected by the bend sensors and/or accelerometers of the wearable 110 worn on the user's right hand), the rules engine 138 maps the user's gesture to a musical note within the zone in which the user's right hand is located. As another example, if the user 106 is wearing a sensor-instrumented wearable 110 about his ankle, the rules engine 138 can determine that the user 106 intends to push a pedal (e.g., of a drum set) based on the gesture data 210 indicating that the user is moving his ankle up and down and the image data 212 and/or the UWB position data 213 indicating that the user's ankle is located in a zone corresponding to a location of a virtual pedal. Thus, the rules engine 138 combines the gesture data 210 and the image data 212 and/or the UWB position data 213 to determine which musical note(s) the user 106 intends to play and/or other actions the user 106 intends to take with respect to the virtual musical instrument(s) 104.

The example rules engine 138 of FIG. 2 generates one or more data streams based on the analysis of the image data 212 and/or the UWB position data 213 and the gesture data 210. For example, the rules engine 138 generates an audio output data stream 216 based on, for example, the musical notes that the rules engine 138 determines the user 106 intends to play and/or other actions the rules engine 138 determines that the user 106 intends to take with respect to audio of the virtual musical instrument(s) 104, such as raising a volume level. The rules engine 138 transmits the audio output data stream 216 to an audio output generator 218 of the example VR processor 102 of FIG. 2. The audio output generator 218 can be implemented by, for example, music software that generates the audio output 140 corresponding to the musical notes that the user 106 intends to play based on the audio output data stream 216. For example, the audio output generator 2128 can be implemented by commercially available software sold under the product names Live™, Link™ and/or Push by Ableton AG. The rules engine 138 can format the audio output data stream 216 in a format that can be read by the audio output generator 218. In some examples, the mapping of the finger movements of the user 106 to the musical notes to be played is performed by the audio output generator 218.

In some examples, the rules engine 138 sends the audio output data stream 216 to the audio output generator in substantially real-time as the user 106 interacts with the virtual musical instrument(s) 104. The audio output generator 218 generates the audio output 140 for presentation via the one or more audio players 142 (e.g., speakers) in substantially real-time with respect to the gestures performed by the user 106.

In some examples, the audio output data stream 216 can include data regarding other musical parameters in addition to or as an alternative to data related to the musical notes that the user 106 intends to play. For example, the rules engine 138 can determine that the user 106 wishes to raise or lower the audio volume level based on the image data 212 indicating the distance of the user's hands above the virtual instrument as detected by the cameras 114, 116 (e.g., based on the image data 212 in the Z direction of an X-Y-Z plane). In some examples, the rules engine 138 also uses the gesture data 210 indicating that the user 106 is moving his arm up and down to determine that the user wishes to change the volume level. The audio output 140 generated by the audio output generator 218 based on the audio output data stream 216 includes the desired volume level. In the example system 100 of FIGS. 1 and 2, other audio parameters with respect to the virtual musical instrument(s) 104 can be controlled based on the gesture data 210, the image data 212 and/or the UWB position data 213. Examples of such audio parameters include key velocity (e.g., of an instrument keyboard), vibrato, and/or polyphonic aftertouch.

In some examples, the audio data stream 216 includes data regarding musical filters and/or other musical effects or parameters to augment or modify a musical performance created by the user 106 using a physical (e.g., non-virtual) musical instrument. For example, the user 106 can wear the sensor-instrumented wearable 110 on his hand while strumming a guitar. Based on the position of the user's hand and the gestures performed by the user 106, the rules engine 138 can determine that the user 106 intends to add a filter to the audio output generated by the guitar. In such examples, the resulting audio output 140 includes a filter, accompanying music, and/or other audio effects such that the musical performance produced by the guitar is augmented or modified. Thus, in the example system 100, the rules engine 138 can generate one or more instructions with respect to audio parameters for the virtual musical instrument(s) 104 and/or non-virtual musical instruments.

In some examples, the rules engine 138 generates a visual output data stream 220 corresponding to one or more graphical representations that are to be displayed, for example, when the audio output 140 is played. The rules engine 138 transmits the visual output data stream 220 to a visualization output generator 222 via a databus. The visualization output generator 222 generates the one or more visual outputs 144 based on the data stream 220. For example, the visual output data stream 20 can include data regarding the keys of the virtual musical instrument 104 that correspond to the notes that the user 106 intends to play. The visualization output generator 222 can generate the visual output(s) 144 including a digital representation of the virtual musical instrument 104 with the corresponding keys 145 highlighted, as illustrated in FIG. 1. The visual output(s) 224 are displayed via the visualization presenter 108 (e.g., a display screen). The visual output(s) 224 can be displayed in substantially real-time with respect to, for example, the playing of the audio output 140 via the audio player(s) 142.

In some examples, the rules engine 138 generates a special effects data stream 24 corresponding to one or more special effects that are to be implemented during, for example, the presentation of the audio output(s) 140 and/or the visual output(s) 144. In the context of virtual content related to musical performances, the special effects can include lighting effects, smoke effects, and/or other stage effects. The rules engine 138 transmits the special effects data stream 224 to a special effects output generator 226, which generates the one or more special effects outputs 146. In the example system 100 of FIGS. 1 and 2, the special effect output(s) 146 are presented via the special effects presenter(s) 148 (e.g., lights).

Figure 3:
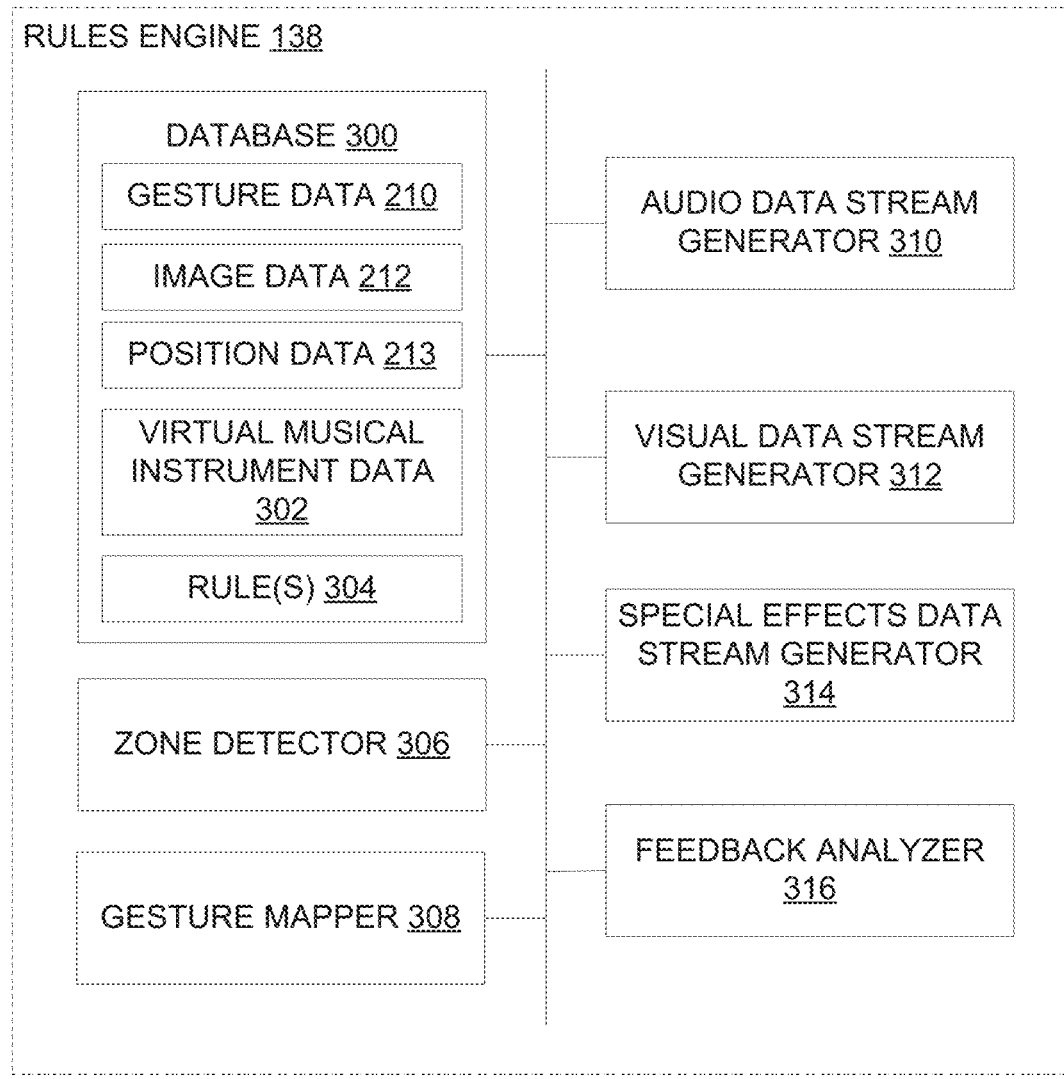
FIG. 3 is a block diagram of an example implementation of the rules engine of FIGS. 1 and 2.

FIG. 3 is a block diagram of an example implementation of the rules engine 138 of FIGS. 1 and 2. The rules engine 138 of the example of FIG. 3 includes a database 300. The database 300 stores the gesture data 210 received from the sensor-instrumented wearable(s) 110, the image data 212 received from the first and/or second cameras 114, 116, and/or the UWB position data 213 received from UWB radio platform processor 131. In examples where the position of the user's body part(s) relative to the zones is determined at the first and/or second cameras 114, 116 and/or the UWB radio platform 128 (e.g., via respective processor(s) of the first and/or second cameras 114, 116 and/or the UWB radio platform processor 131), the database 300 stores the zone identifying data transmitted to the VR processor 102 from the cameras 114, 116 and/or the UWB radio platform 128.

The database 300 also stores virtual musical instrument data 302, or data about one or more features, characteristics, etc. of the virtual musical instrument(s) 104. For example, the virtual musical instrument data 302 can include data such as the type(s) of instrument(s) and the placement of the instrument(s) relative to, for example, the zones 120, 122, 124, 126 associated with the field of view 118 of the cameras 114, 116 and/or the zones 132, 134, 136 associated with the UWB radio platform 8.

The database 300 also stores one or more rules 304 associated with, for example, the gesture data 210, the image data 212, the UWB position data 213, the virtual musical instrument(s) 104, special effects, etc. A first example rule 304 identifies bending of a finger as a trigger that the user 106 intends to play a musical note. Another example rule 304 identifies vertical movement of the user's arm away from the first and/or second cameras 114, 116 as an indication that the user wishes to increase the audio volume level. Another example rule 304 indicates that when the volume is raised, lights should be displayed as a special effect. Many other rules are possible. The rule(s) 304 can be defined via, for example, one or more user inputs received by the VR processor 102.

The example rules engine 138 of FIG. 3 includes a zone detector 306. The zone detector 306 analyzes the image data 212 with respect to the zones 120, 122, 124, 126 of the field of view 118 of first and/or second cameras 114, 116 and/or the UWB position data 213 with respect to the zones 132, 134, 136 of the UWB radio platform 128. The zone detector 306 identifies the zone(s) in which the user's hands (and/or other body parts) are positioned in substantially real-time based on the image data 212 and/or the UWB position data 213. The zone detector 306 determines which portion(s) of the virtual musical instrument(s) 104 are associated with the zone(s) based on the virtual musical instrument data 302. Thus, the zone detector 306 identifies where the user's hands (and/or other body parts) are positioned relative to the virtual musical instrument(s) 104.

The example rules engine 138 of FIG. 3 includes a gesture mapper 308. Based on the gesture data 210, the gesture mapper 308 maps or associates the gestures of the user 106 with one or more other actions to be taken with respect to the virtual musical instrument(s) 104. The actions can include, for example, the playing of certain musical notes by the virtual musical instrument(s) 104, the changing of one or more audio parameters such as volume level, etc. In some examples, the gesture mapper 308 determines the actions to be taken with respect to the virtual musical instrument(s) 104 based on the rule(s) 304 stored in the database 300 of the example rules engine 138 of FIG. 3.

For example, the gesture mapper 308 associates the gesture data 210 indicative of the user bending his wrist with drum tapping based on one or more of the rules 304. As another example, the gesture mapper 308 associates the gesture data 210 indicating that the user is flipping the palm of his hand with an audio pitch change based on one or more of the rules 304. As another example, the gesture mapper 308 associates the gesture data 210 indicative of finger bending with playing keys of a keyboard of the virtual musical instrument 104. In some such examples, the gesture mapper 308 maps the bending of the user's finger(s) to one or more musical notes to be played by the virtual music instrument 104. In other examples, the mapping of the gestures to the musical notes is performed by the audio output generator 218 of FIG. 2 (e.g., via music software).

The example rules engine 138 of FIG. 3 includes an audio data stream generator 310. The audio data stream generator 310 generates the audio output data stream 216 based on the identification of the position of the user's hands (and/or other body parts) relative to the virtual musical instruments) 104 by the zone detector 306 and the mapping of the gesture data 210 with respect to actions to be taken in relation to the virtual musical instrument(s) 104 by the gesture mapper 308. As disclosed above in connection with FIG. 2, the rules engine 138 transmits the audio output data stream 216 to the audio output generator 218 to generate the audio output(s) 140.

The example rules engine 138 of FIG. 3 includes a visual data stream generator 312. The visual data stream generator 312 generates the visual output data stream 220 based on the one or more rules 304 and/or the audio output data stream 216 generated by the audio data stream generator 310. For example, the rule(s) 304 can indicate that a graphical representation of the virtual musical instrument 104 being played should be generated. The rule(s) 304 can also indicate that the portions of the virtual musical instrument 104 being played (e.g., as determined by the gesture mapper 308 and/or the audio data stream generator 310) should be highlighted in the graphical representation (e.g., as illustrated in FIG. 1).

The example rules engine 138 of FIG. 3 includes a special effects data stream generator 314. The special effects data stream generator 314 generates the special effects output data stream 224 based on the one or more rules 304, the audio output data stream 216 generated by the audio data stream generator 310, and/or the visual Output data stream 220 generated by the visual data stream generator 314. For example, the rule(s) 304 can indicated that lights should flash when the zone detector 306 and the gesture mapper 308 determine that the user intends to play the drums based on the gesture data 210, the image data 212, and/or the UWB position data 213.

The example rules engine 138 of FIG. 3 includes a feedback analyzer 316. The feedback analyzer 316 analyzes the gesture data 210, the image data 212, the UWB position data 213, the virtual musical instrument data 302, the audio output data stream 216, the visual output data stream 220, and/or the special effects output stream 226. The feedback analyzer 316 identifies patterns in the data, such as frequently used gestures by the user 106 based on the gesture data 210 and the musical instrument data 302. The feedback analyzer 316 can update the rule(s) 304 or, in some examples, propose new rule(s) 304 to increase an efficiency of the rules engine 138 in associating the gesture data 210, image data 212, and/or the UWB positon data 213 with actions that the user 106 intends to take with respect to the virtual content.

While an example manner of implementing the example system 100 are illustrated in FIGS. 1-3, one or more of the elements, processes and/or devices illustrated in FIGS. 1-3 may be combined, divided, re-arranged, omitted, eliminated and/or implemented in any other way. Further, the example rules engine 138, the example visualization presenter 108, the example audio player(s) 142, the example special effects presenter(s) 148, the example audio output generator 218, the example visualization output generator 222, the example special effects output generator 226, the example database 300, the example zone detector 306, the example gesture mapper 308, the example audio data stream generator 310, the example visual data stream generator 312, the example special effects data stream generator 314, the example feedback analyzer 316, and/or, more generally, the example system 100 of FIGS. 1-3 may be implemented by hardware, software, firmware and/or any combination of hardware, software and/or firmware. Thus, for example, any of the example rules engine 138, the example visualization presenter 108, the example audio player(s) 142, the example special effects presenter(s) 148, the example audio output generator 218, the example visualization output generator 222, the example special effects output generator 226, the example database 300, the example zone detector 306, the example gesture mapper 308, the example audio data stream generator 310, the example visual data stream generator 312, the example special effects data stream generator 314, the example feedback analyzer 316, and/or, more generally, the example system 100 of FIGS. 1-3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example rules engine 138, the example visualization presenter 108, the example audio player(s) 142, the example special effects presenter(s) 148, the example audio output generator 218, the example visualization output generator 222, the example special effects output generator 226, the example database 300, the example zone detector 306, the example gesture mapper 308, the example audio data stream generator 310, the example visual data stream generator 312, the example special effects data stream generator 314, the example feedback analyzer 316, and/or, more generally, the example system 100 of FIGS. 1-3 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIGS. 1-3 may include one or more elements, processes and/or devices in addition to, or instead of, those illustrated in FIGS. 1-3, and/or may include more than one of any or all of the illustrated elements, processes and devices.

Figure 4:
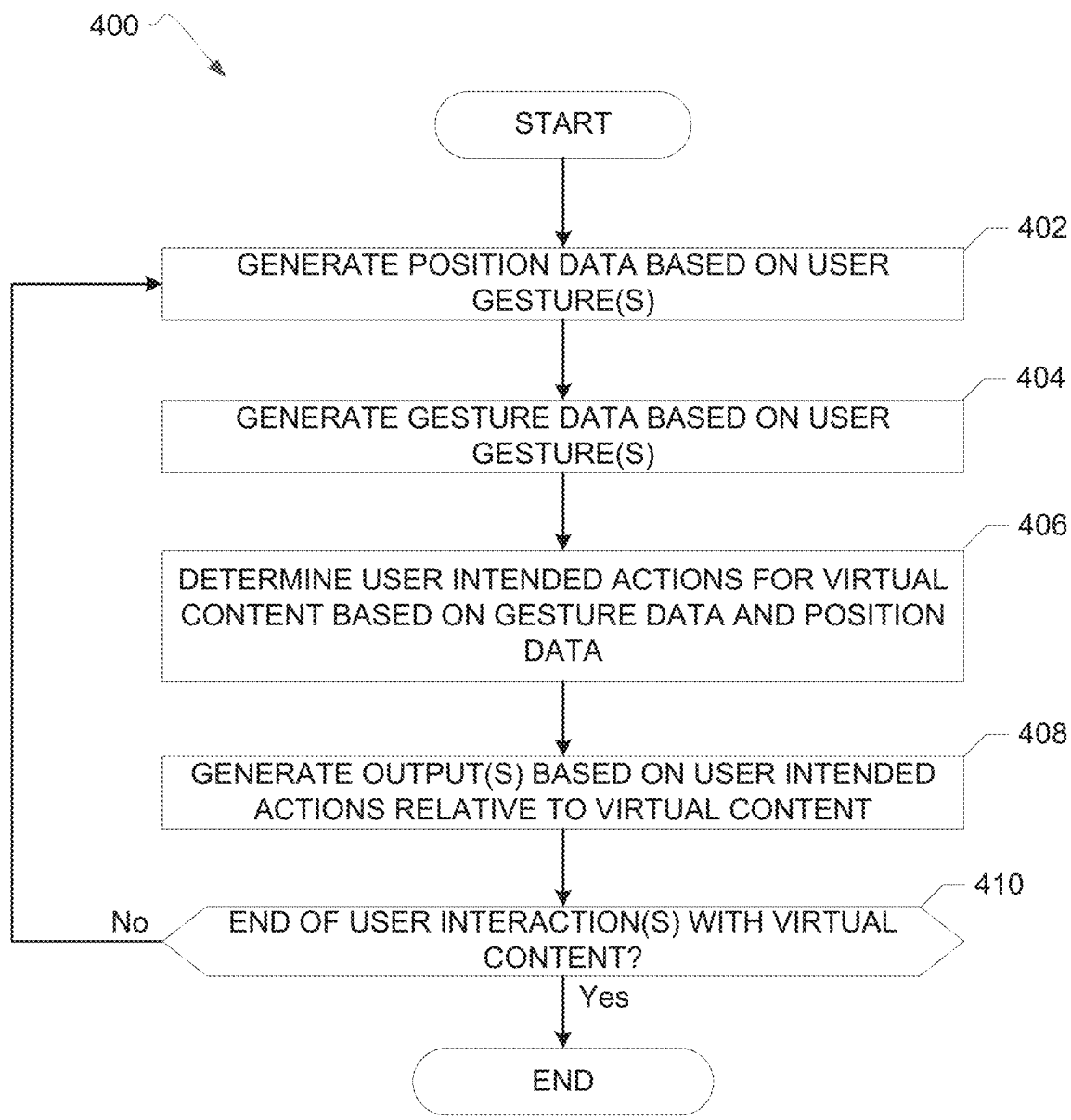
FIG. 4 is a flowchart representative of example machine readable instructions that may be executed to implement the example system of FIGS. 1-3.

A flowchart representative of example machine readable instructions which may be executed to implement the example system 100 of FIGS. 1-3 and/or components thereof illustrated in FIG. 1-3 is shown in FIG. 4. In this example, the machine readable instructions comprise a program for execution by one or more processors such as the processor 102 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with processor 102, but the entire program and/or parts thereof could alternatively be executed by a device other than the processor 102 and/or embodied in firmware or dedicated hardware. Further, although the example program is described with reference to the flowchart illustrated in FIG. 5, many other methods of implementing the example system 100 and/or components thereof illustrated in FIG. 1-3 may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart representative of example machine-readable instructions that, when executed, cause the example system 100 of FIGS. 1-3 to generate one or more audio, visual, and/or special effects outputs in response to one or more physical movements/gestures of a user (e.g., the user 106 of FIG. 1) simulating interaction with virtual reality content. In the example of FIG. 4, the virtual content can include one or more virtual musical instrument(s) (e.g., the virtual musical instrument(s) 104 of FIGS. 1 and 2) that a user plays via one or more gestures (e.g., hand gestures) and/or other types of virtual content. The example instructions of FIG. 4 can be executed by the VR processor 102 of FIGS. 1-3. One or more of the instructions of FIG. 4 can be executed by the processor(s) 202 of the wearable(s) 110 of FIGS. 1 and 2, respective processor(s) associated with the cameras 114, 116 of FIGS. 1 and 2, and/or the UWB radio platform processor 131 of the UWB radio platform 128 of FIGS. 1 and 2.

In the example of FIG. 4, the example first and/or second cameras 114, 116 of FIGS. 1 and 2 generate image data 212 with respect to the position of one or more of the user's body parts as the user 106 interacts with the virtual content (block 402). For example, the first and/or second cameras 114, 116 track a position of the hands of the user 106 when the hands are in the field of view 118 via one or more images. Additional or fewer cameras could be used to generate image data to track the position of the user's body part(s). Additionally or alternatively, the example UWB radio platform 128 generates UWB position data 213 based on signal data transmitted by the UWB radio transmitter(s) 214 of the wearable 110 and detected by the UWB radio receiver(s) 130 of the UWB radio platform 128. The UWB radio platform processor 131 calculates a position of the user's hands based on the signal data to generate the UWB position data 213.

The example processor 202 of the wearable 110 of FIGS. 1 and 2 generates gesture data 210 based on data collected by the sensor(s) 200 of at least one sensor-instrumented wearable 110 of FIGS. 1 and 2 during movement of at least one body part (e.g., a hand, an ankle) on which the user 106 wears the wearable 110 (block 404). The example gesture detector 208 generates the gesture data 210 by comparing the sensor data to the calibration data 206, or data associated with known gestures and/or patterns in known gesture data. For example, the gesture detector 208 can determine that when the gesture data 210 indicates changes in angular positions of the user's wrist, the user is waving his hand based on the calibration data 206. The gesture detector 208 determines or deduces the gestures or action intended by the user 106 based on the motion data collected by the sensor(s) 200, such as finger tapping, wrist bending, foot tapping, etc.

The example rules engine 138 of the example VR processor 102 of FIGS. 1-3 determines one or more user intended actions with respect to the virtual content (e.g., the virtual musical instrument(s) 104) based on the gesture data 210, the image data 212, and/or the UWB position data 213 (block 406). For example, the zone detector 306 determines a position of the body parts of the user being monitored relative to one or more of the zones 120, 122, 124, 126 associated with the field of view 118 of the cameras 114, 116 and/or the zones 132, 134, 136 of the UWB radio platform 128. In some examples, the respective processors of the cameras 114, 116 and/or the UWB radio platform 128 (e.g., the UWB radio platform processor 131) determine the position of the user's hands relative to the zones. The zone detector 306 associates the positions of the body part(s) being monitored in the zones with respect to the virtual content. For example, zone detector 306 determines the portion(s) of the virtual musical instrument(s) 104 that correspond to the zone(s) in which the user's hands are positioned. In some examples, the zone detector 306 uses one or more of the rules 304 to determine the positions of the user's body part(s) relative to the zones and the corresponding portions of the virtual musical instrument(s) 104.

The gesture mapper 308 of the example rules engine 138 maps or associates the gesture data 210 with one or more actions to be taken with respect to the virtual content, such as playing a musical note via the virtual musical instruments) 104. The gesture mapper 308 maps the gesture data 210 to user actions with respect to the virtual content based on one or more of the rules 304.

For example, the zone detector 306 determines that when the user's right hand is in the first zone 122 of the field of view 118 based on the image data 213 and/or the UWB position data 213, the user's right hand is proximate to the first portion 121 of the virtual musical instrument 104. The gesture mapper 308 determines that the gesture data 210 indicating that the user 106 is bending his finger indicates that the user 106 intends to play a specific musical note by depressing a specific key of the virtual musical instrument(s) 104 (e.g., based on one or more of the rules 304 and the relative locations (virtual and real) of the key and the user's hand). In this example, based on the position of the user's hand with respect to the first portion 121 of the virtual musical instrument 104 as determined by the zone detector 306 and the association of finger bending with playing one or more musical notes as determined by the gesture detector 308, the rules engine 138 may determine, for example, that the user 106 intends to play a musical note via the first portion 121 of the virtual musical instrument 104.

Based on the user intended actions determined by the example rules engine 138 with respect to the virtual content, the rules engine generates data to produce one or more outputs associated with the virtual content (block 408). For example, if the rules engine 138 determines that the user 106 intends to play a musical note in the first portion 121 of the virtual musical instrument 104, the audio data stream generator 310 of the example rules engine 138 generates the audio output data stream 216. The audio outputs data stream 216 can be processed by the example audio output generator 216 to generate one or more audio outputs 140. The audio output(s) 140 can include, for example, audio corresponding to the musical note(s) that the user 106 intends to plays via the virtual musical instrument(s) 104, music filters, volume level, etc. for presentation via one or more of the audio player(s) 142.

The rules engine 138 can also generate visual and/or other special effect outputs. For example, the visual data stream generator 312 of the example rules engine 138 can generate the visual output data stream 220 based on one or more of the rules 304. The visual output data stream 220 is processed by the visualization output generator to produce one or more visual output(s) 144. The visual output(s) 144 can include, for example, a digital representation of the virtual content to be displayed via the visualization presenter 108. The special effects data stream generator 314 of the example rules engine 138 can generate the special effects data strew. 224 for producing the special effect output(s) 146, such as lighting, via the special effects output generator 226 and the special effects presenter(s) 148.

If the VR processor 102 does not receive the gesture data 210, the image data 212, and/or the UWB position data 213 (e.g., after a predefined period of time) or if sensor(s) 200 of the wearable 110 do not detect motion or other user gestures (e.g., after a predefined period of time), the rules engine 138 determines that the user is no longer interacting with the virtual content (block 410). In such examples, the instructions of FIG. 4 end. If further user interaction(s) are detected, the example instructions of FIG. 4 continue to analyze the gesture data 210, the image data 210, and the UWB position data 213 received at the VR processor 102 until no further user interactions are detected.

Figure 5:
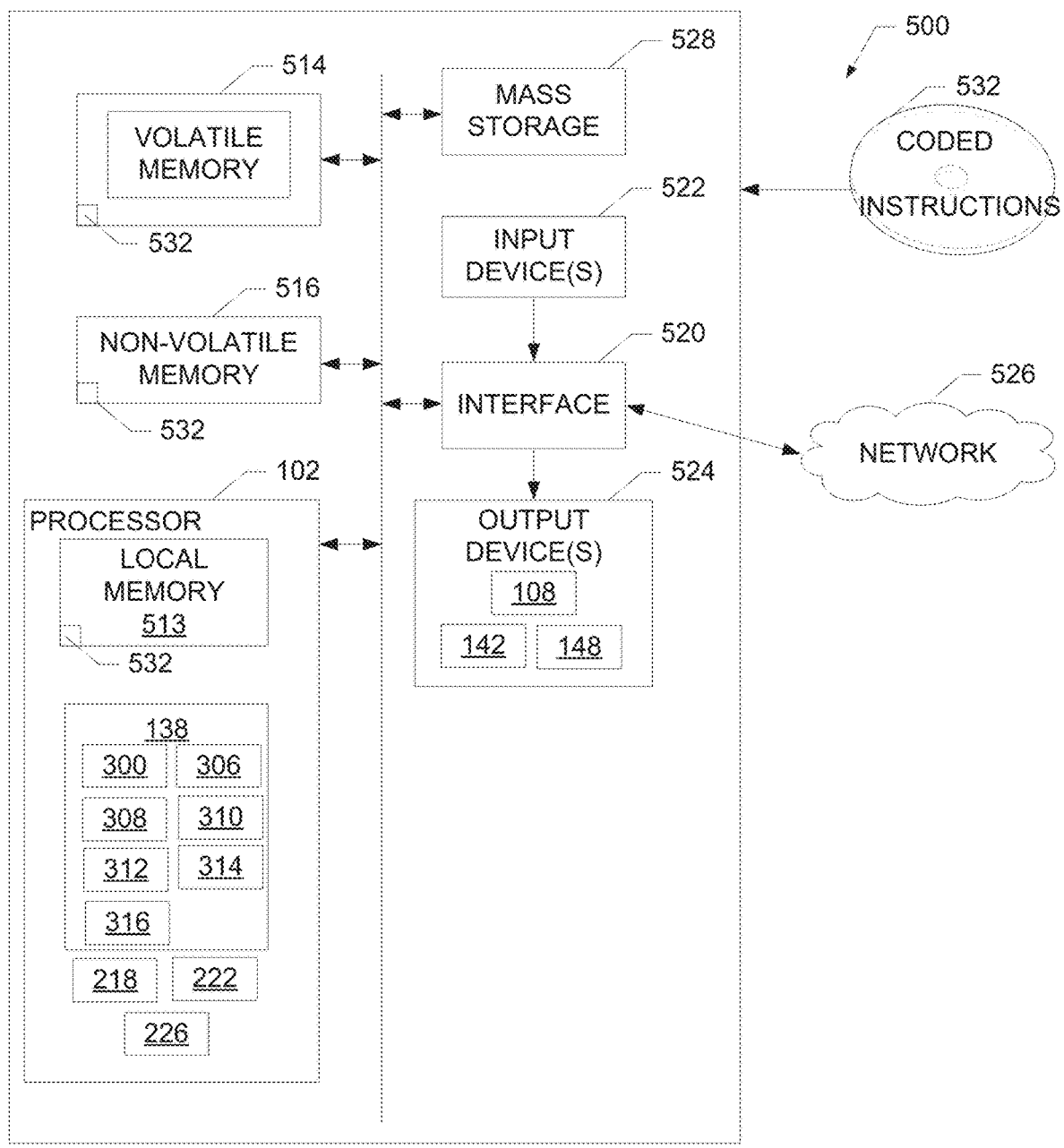
FIG. 5 illustrates an example processor platform that may execute the example instructions of FIG. 4 to implement the example system of FIGS. 1-3.

FIG. 5 is a block diagram of an example processor platform 1000 capable of executing the instructions of FIG. 4 to implement the example the example rules engine 138, the example audio player(s) 142, the example special effects presenter(s) 148, the example audio output generator 218, the example visualization output generator 222, the example special effects output generator 226, the example databases 204, 300, the example zone detector 306, the example gesture mapper 308, the example audio data stream generator 310, the example visual data stream generator 312, the example special effects data stream generator 314, the example feedback analyzer 316, and/or, more generally, the example system 100 of FIGS. 1-3. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a virtual reality presenter device, or any other type of computing device.

The processor platform 500 of the illustrated example includes the VR processor 102. The VR processor 102 of the illustrated example is hardware. For example, the VR processor 102 can be implemented by one or more integrated circuits, logic circuits, microprocessors or controllers from any desired family or manufacturer.

The VR processor 102 of the illustrated example includes a local memory 513 (e.g., a cache). The VR processor 102 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the VR processor 102. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 108, 142, 148, 524 are also connected to the interface circuit 520 of the illustrated example. The output devices 108, 142, 148, 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD.

From the foregoing, it will be appreciated that methods, systems, and apparatus have been disclosed to generate one or more audio, visual, and/or special effect outputs based on user interaction with virtual content in a virtual reality environment. Disclosed examples utilize multiple inputs to more accurately determine position(s) and gestures of the user's body parts relative to the virtual content, such as one or more virtual musical instruments. Thus, disclosed examples intelligently and efficiently respond to a user's interactions with virtual content by generating audio, visual, and/or special effects in substantially real-time that accurately reflect the user's intentions in interacting with the virtual content.

Example methods, apparatus, systems, and articles of manufacture to generate one or more audio, visual, and/or special effect outputs based on user interaction with virtual content are disclosed herein. The following is a non-exclusive list of examples disclosed herein. Other examples may be included above. In addition, any of the examples disclosed herein can be considered in whole or in part, and/or modified in other ways.

Example 1 is an apparatus including at least two of an on-body sensor, an off-body sensor, and an RF local triangulation system to detect at least one of a position or a movement of a body part of a user relative to a virtual instrument. The example apparatus includes a processor to generate an audio output of the virtual instrument in response to the at least one of the position or the movement.

Example 2 includes the apparatus as defined in example 1, wherein the off-body sensor is a camera and the camera is to generate image data with respect to the at least one of the position or the movement of the body part relative to the virtual instrument.

Example 3 includes the apparatus as defined in example 2, wherein a field of view of the camera includes a first zone and a second zone and the processor is to identify the at least one of the position or the movement of the body part based on the image data and the one or more of the first zone or the second zone.

Example 4 includes the apparatus as defined in any of examples 1-3, wherein the on-body sensor includes one or more of a bend sensor, an accelerometer, a gravity sensor, a force sensor, or an angular position sensor.

Example 5 includes the apparatus as defined in example 1, wherein the processor is a first processor and the on-body sensor is coupled to a wearable device worn by the user, the wearable including a second processor to generate gesture data based on data collected by the on-body sensor.

Example 6 includes the apparatus as defined in example 5, wherein the second processor is to compare the gesture data to known gesture data to generate pre-processed gesture data, the second processor to transmit the pre-processed gesture data to the first processor.

Example 7 includes the apparatus as defined in examples 5 or 6, wherein the processor is to map the gesture data to known gesture data for the virtual instrument.

Example 8 includes the apparatus as defined in any of examples 1, 5, or 6, wherein the processor is to determine the at least one of the position or the movement of the body part of the user relative to a stage on which the user interacts with the virtual instrument based on position data generated by the RF local triangulation system.

Example 9 includes the apparatus as defined in any of examples 1, 5, or 6, wherein the RF local triangulation system includes a radio transmitter coupled to a wearable device worn by the user and a radio receiver coupled to a platform on which the user interacts with the virtual instrument.

Example 10 includes the apparatus as defined in any of examples 1-3, 5, or 6, wherein the processor is to generate a visual output in response to the at least one of the position or the movement.

Example 11 includes the apparatus as defined in example 10, wherein the visual output includes a visualization of the position of the least one of the position or the movement of the body part of the user relative to the virtual instrument.

Example 12 includes the apparatus as defined in any of examples 1-3, 5, or 6, wherein the processor is to generate a special effect based on the audio output.

Example 13 includes the apparatus as defined in example 12, wherein the special effect is a lighting effect.

Example 14 includes the apparatus as defined in any of examples 1-3, 5, or 6, wherein the audio output is to include one or more of a musical note, a volume level, or an audio pitch based on the at least one of the position or the movement.

Example 14 include the apparatus as defined in example 1, wherein the processor is to cause one or more of the on-body sensor to generate gesture data with respect to the at least one or the position or the movement of the body part, the off-body sensor to generate image data with respect to the at least one or the position or the movement of the body part, and the RF local triangulation system to generate position data with respect to the at least one or the position or the movement of the body part.

Example 16 is a method including detecting, using at least two of an on-body sensor, an off-body sensor, and an RF local triangulation system, at least one of a position or a movement of a body part of a user interacting with a virtual instrument; and generating, by executing an instruction with at least one processor, an audio output of the virtual instrument in response to the at least one of the position or the movement.

Example 17 includes the method as defined in example 16, wherein the off-body sensor is a camera, and further including generating image data with respect to the at least one or the position or the movement of the body part relative to the virtual instrument.

Example 18 includes the method as defined in example 17, wherein a field of view of the camera includes a first zone and a second zone, and further including identifying the position of the body part based on the image data and the one or more of the first zone or the second zone.

Example 19 includes the method as defined in any of examples 16-18, wherein the on-body sensor includes one or more of a bend sensor, an accelerometer, a gravity sensor, a force sensor, or an angular position sensor.

Example 20 includes the method as defined in example 16, wherein the at least one processor includes a first processor and the on-body sensor is coupled to a wearable device worn by the user, the wearable device including a second processor, and further including generating, by executing an instruction with the second processor, gesture data based on data collected by the on-body sensor.

Example 21 includes the method as defined in example 20, further including performing, by executing an instruction with the second processor, a comparison of the gesture data to known gesture data; generating, by executing an instruction with the second processor, pre-processed gesture data based on the comparison; and transmitting, by executing an instruction with the second processor, the pre-processed gesture data to the first processor.

Example 22 includes the method as defined in any of examples 20 or 21, further including mapping the gesture data to known gesture data for the virtual instrument.

Example 23 includes the method as defined in any of examples 16, 20, or 21, further including determining the at least one of the position or the movement of the body part of the user relative to a stage on which the user interacts with the virtual instrument based on position data generated by the RF local triangulation system.

Example 24 includes the method as defined in any of examples 16, 20, or 21, wherein the RF local triangulation system includes a radio transmitter coupled to a wearable device worn by the user and a radio receiver coupled to a platform on which the user interacts with the virtual instrument.

Example 25 includes the method as defined in any of examples 16-18, 20, 21, further including generating a visual output based on the at least one of the position or the movement.

Example 26 includes the method as defined in example 25, wherein the visual output includes a visualization of the at least one of the position or the movement of the body part of the user relative to the virtual instrument.

Example 27 includes the method as defined in any of examples 16, 20, or 21, further including generating a special effect based on the audio output.

Example 28 includes the method as defined in example 27, wherein the special effect is a lighting effect.

Example 29 includes the method as defined in any of examples 16-18, 20, or 21, wherein the audio output is to include one or more of a musical note, a volume level, or an audio pitch based on the at least one of the position or the movement.

Example 30 includes the method as defined in example 16, further including causing one or more of the on-body sensor to generate gesture data with respect to the at least one or the position or the movement of the body part, the off-body sensor to generate image data with respect to the at least one or the position or the movement of the body part, and the RF local triangulation system to generate position data with respect to the at least one or the position or the movement of the body part.

Example 31 is a computer readable storage medium comprising instructions that, when executed, cause a machine to at least detect, using at least two of an on-body sensor, an off-body sensor, and an RF local triangulation system, at least one of a position or a gesture of a body part of a user interacting with a virtual instrument; and generate an audio output of the virtual instrument corresponding to the at least one of the position or the gesture.

Example 32 includes the computer readable storage medium as defined in example 31, wherein the off-body sensor is a camera, and wherein the instructions, when executed, further cause the machine to generate image data with respect to the at least one of the position or the gesture of the body part relative to the virtual instrument.

Example 33 includes the computer readable storage medium as defined in example 32, wherein a field of view of the camera includes a first zone and a second zone, and the instructions, when executed, further cause the machine to identify the position of the body part based on the image data and the one or more of the first zone or the second zone.

Example 34 includes the computer readable storage medium as defined in any of examples 31-33, wherein the on-body sensor includes one or more of a bend sensor, an accelerometer, a gravity sensor, a force sensor, or an angular position sensor.

Example 35 includes the computer readable storage medium as defined in example 31, wherein the instructions, when executed, further cause the machine to determine the at least one of the position or the gesture of the body part of the user relative to a stage on which the user interacts with the virtual instrument based on position data generated by the RF local triangulation system.

Example 36 includes the computer readable storage medium as defined in example 31, wherein the RF local triangulation system includes a radio transmitter coupled to a wearable device worn by the user and a radio receiver coupled to a platform on which the user interacts with the virtual instrument.

Example 37 includes the computer readable storage medium as defined in any of examples 31-33, wherein the instructions, when executed, further cause the machine to generate a visual output based on the at least one of the position or the movement.

Example 38 includes the computer readable storage medium as defined in example 37, wherein the visual output includes a visualization of the at least one of the position or the gesture of the body part of the user relative to the virtual instrument.

Example 39 includes the computer readable storage medium as defined in example 31, wherein the instructions, when executed, further cause the machine to generate a special effect based on the audio output.

Example 40 includes the computer readable storage medium as defined in example 39, wherein the special effect is a lighting effect.

Example 41 includes the computer readable storage medium as defined in any of examples 31-33, wherein the audio output is to include one or more of a musical note, a volume level, or an audio pitch based on the at least one of the position or the gesture.

Example 42 include includes the computer readable storage medium as defined in example 31, wherein the instructions, when executed, further cause the machine to cause one or more of the on-body sensor to generate gesture data with respect to the at least one or the position or the gesture of the body part, the off-body sensor to generate image data with respect to the at least one or the position or the gesture of the body part, and the RF local triangulation system to generate position data with respect to the at least one or the position or the gesture of the body part.

Example 43 is an apparatus including means for detecting a position of a body part of a user interacting with a virtual instrument; means for detecting at least one of a movement or a gesture of the body part of the user interacting with the virtual instrument; and means for generating an audio output of the virtual instrument based on the at least one of the position, the movement, or the gesture.

Example 44 includes the apparatus as defined in example 43, wherein the means for detecting the position of the body part includes one or more of a camera or an RF local triangulation system.

Example 45 includes the apparatus as defined in example 43, wherein the means for detecting the position includes the camera, the camera to generate image data with respect to the position of the body part relative to the virtual instrument, and a field of view of the camera includes a first zone and a second zone, the means for generating the audio output to identify the position of the body part based on image data generated by the camera and the one or more of the first zone or the second zone.

Example 46 includes the apparatus as defined in any of examples 43-45, wherein the means for detecting at least one of a movement or a gesture of the body part of the user includes one or more of a bend sensor, an accelerometer, a gravity sensor, a force sensor, or an angular position sensor.

Example 47 includes the apparatus as defined in example 43, wherein the means for detecting the at least one of the movement or the gesture of the body part includes a sensor coupled to a wearable device worn by the user.

Example 48 includes the apparatus as defined in example 47, further including means for generating gesture data at the wearable device.

Example 49 includes the apparatus as defined in example 48, further including means for comparing the gesture data to known gesture data to generate pre-processed gesture data, the means for comparing to transmit the pre-processed gesture data to the means for generating the audio output.

Example 50 includes the apparatus of examples 48 or 49, wherein the means for generating the audio output is to map the gesture data to known gesture data for the virtual instrument.

Example 51 includes the apparatus as defined in any of examples 43-45 or 47-49, further including means for generating a visual output based on the at least one of the position, the movement, or the gesture.

Example 52 includes the apparatus as defined in example 51, wherein the visual output includes a visualization of the at least one of the position, the movement, or the gesture of the body part of the user relative to the virtual instrument.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
at least one of: (a) an on-body sensor and an off-body sensor, (b) the on-body sensor and an RF local triangulation system, or (c) the off-body sensor and the RF local triangulation system, to detect a position and a movement of a body part of a user relative to a virtual instrument; and
a processor to:
identify the position of the body part of the user as being in a first positional zone or a second positional zone, the first positional zone corresponding to a first portion of the virtual instrument and the second positional zone corresponding to a second portion of the virtual instrument; and
generate an audio output of the virtual instrument in response to the movement and the body part being in the first positional zone or the second positional zone.

2. An apparatus comprising:
at least one of: (a) an on-body sensor and an off-body camera, (b) the on-body sensor and an RF local triangulation system, or (c) the off-body camera and the RF local triangulation system, to detect a position and a movement of a body part of a user relative to a virtual instrument, the off-body camera to generate image data with respect to at least one of the position or the movement of the body part relative to the virtual instrument; and
a processor to:
identify the position of the body part of the user as within a first positional zone or a second positional zone, the first positional zone corresponding to a first portion of the virtual instrument and the second positional zone corresponding to a second portion of the virtual instrument; and
generate an audio output of the virtual instrument in response to the movement and the body part being within the first positional zone or the second positional zone.

3. The apparatus of claim 2, wherein a field of view of the off-body camera includes the first positional zone and the second positional zone, the processor to identify the position of the body part as being within the first positional zone or the second positional zone based on the image data.

4. The apparatus of claim 1, wherein the on-body sensor includes one or more of a bend sensor, an accelerometer, a gravity sensor, a force sensor, or an angular position sensor.

5. An apparatus comprising:
at least one of: (a) an on-body sensor and an off-body sensor, (b) the on-body sensor and an RF local triangulation system, or (c) the off-body sensor and the RF local triangulation system, to detect at least one of a position or a movement of a body part of a user relative to a virtual instrument; and
a first processor to generate an audio output of the virtual instrument in response to the at least one of the position or the movement, the on-body sensor coupled to a wearable device to be worn by the user, the wearable device including a second processor to generate gesture data based on data collected by the on-body sensor.

6. The apparatus of claim 5, wherein the second processor is to compare the gesture data to known gesture data to generate pre-processed gesture data, the second processor to transmit the pre-processed gesture data to the first processor.

7. The apparatus of claim 5, wherein the first processor is to map the gesture data to known gesture data for the virtual instrument.

8. An apparatus comprising:
at least one of: (a) an on-body sensor and an RF local triangulation system or (b) an off-body sensor and the RF local triangulation system, to detect at least one of a position or a movement of a body part of a user relative to a virtual instrument; and
a processor to generate an audio output of the virtual instrument in response to the at least one of the position or the movement, the processor to determine the at least one of the position or the movement of the body part of the user relative to a stage on which the user interacts with the virtual instrument based on position data generated by the RF local triangulation system.

9. The apparatus of claim 1, wherein the processor is to generate a visual output in response to at least one of the position or the movement.

10. The apparatus of claim 9, wherein the visual output includes a visualization of the at least one of the position or the movement of the body part of the user relative to the virtual instrument.

11. The apparatus of claim 1, wherein the processor is to generate a special effect based on the audio output.

12. The apparatus of claim 11, wherein the special effect is a lighting effect.

13. The apparatus of claim 1, wherein the audio output is to include one or more of (a) a musical note in response to at least one of the movement or the body part being in the first positional zone or the second positional zone, (b) a volume level in response to the movement, or (c) an audio pitch in response to the movement.

14. The apparatus of claim 1, wherein the processor is to cause one or more of: (i) the on-body sensor to generate gesture data with respect to at least one of the position or the movement of the body part, (ii) the off-body sensor to generate image data with respect to at least one of the position or the movement of the body part, or (iii) the RF local triangulation system to generate position data with respect to at least one of the position or the movement of the body part.

15. A method comprising:
detecting, using at least one of: (1) an on-body sensor and an off-body sensor, (2) the on-body sensor and an RF local triangulation system, or (3) the off-body sensor and the RF local triangulation system, a position and a movement of a body part of a user interacting with a virtual instrument;
mapping, by executing an instruction with at least one processor, the position of the body part of the user to a first instrument zone or a second instrument zone, the first instrument zone corresponding to a first portion of the virtual instrument and the second instrument zone corresponding to a second portion of the virtual instrument; and
generating, by executing an instruction with the at least one processor, an audio output of the virtual instrument in response to the movement and the body part being in the first instrument zone or the second instrument zone.

16. A method comprising:
detecting, using at least one of: (1) an on-body sensor and an off-body camera, or (2) the off-body camera and an RF local triangulation system, a position and a movement of a body part of a user interacting with a virtual instrument;
identifying, by executing an instruction with at least one processor, the position of the body part of the user as being in a first positional zone or a second positional zone, the first positional zone corresponding to a first portion of the virtual instrument and the second positional zone corresponding to a second portion of the virtual instrument; and
generating, by executing an instruction with the at least one processor, an audio output of the virtual instrument in response to the movement and the body part being in the first positional zone or the second positional zone.

17. The method of claim 15, wherein the on-body sensor includes one or more of a bend sensor, an accelerometer, a gravity sensor, a force sensor, or an angular position sensor.

18. A method comprising:
detecting, using at least one of: (1) an on-body sensor and an off-body sensor, or (2) the on-body sensor and an RF local triangulation system, at least one of a position or a movement of a body part of a user interacting with a virtual instrument;
generating, by executing an instruction with a second first processor, an audio output of the virtual instrument in response to the at least one of the position or the movement, the on-body sensor coupled to a wearable device to be worn by the user, the wearable device including a second processor; and
generating, when using the on-body sensor for the detecting and by executing an instruction with the second processor, gesture data based on data collected by the on-body sensor.

19. The method of claim 15, further including generating a visual output corresponding to the at least one of the position or the movement.

20. A non-transitory computer readable storage medium comprising instructions that, when executed, cause at least one machine to at least:
detect, based on outputs of at least one of: (i) an on-body sensor and an off-body sensor, (ii) the on-body sensor and an RF local triangulation system, or (iii) the off-body sensor and the RF local triangulation system, a position and a movement of a body part of a user interacting with a virtual instrument;
identify the body part of the user as being in a first positional zone or a second positional zone based on the position, the first positional zone corresponding to a first portion of the virtual instrument and the second positional zone corresponding to a second portion of the virtual instrument; and
generate an audio output of the virtual instrument corresponding to the movement in the first positional zone or the second positional zone.

21. A non-transitory computer readable storage medium comprising instructions that, when executed, cause at least one machine to at least:
detect, based on outputs of at least one of: (i) an on-body sensor and an off-body camera, or (ii) the off-body camera and an RF local triangulation system, a position and a movement of a body part of a user interacting with a virtual instrument;
identify the body part of the user as being in a first instrument zone or a second instrument zone, the first instrument zone corresponding to a first portion of the virtual instrument and the second instrument zone corresponding to a second portion of the virtual instrument; and
generate an audio output of the virtual instrument corresponding to the movement and the identification of the first instrument zone or the second instrument zone.

22. The non-transitory computer readable storage medium of claim 21, wherein a field of view of the off-body camera includes the first instrument zone and the second instrument zone, and the instructions, when executed, further cause the at least one machine to identify the position of the body part based on image data.

23. The non-transitory computer readable storage medium of claim 20, wherein the on-body sensor includes one or more of a bend sensor, an accelerometer, a gravity sensor, a force sensor, or an angular position sensor.

24. A non-transitory computer readable storage medium comprising instructions that, when executed, cause at least one machine to at least:
detect, based on outputs of at least one of: (i) an on-body sensor and an off-body sensor, or (ii) the on-body sensor and an RF local triangulation system, a position and a gesture of a body part of a user interacting with a virtual instrument;

identify the position as corresponding to a first positional zone or a second positional zone, the first positional zone corresponding to a first portion of the virtual instrument and the second positional zone corresponding to a second portion of the virtual instrument; and generate an audio output of the virtual instrument corresponding to the gesture and the first positional zone or the second positional zone, the on-body sensor coupled to a wearable device to be worn by the user.

25. The non-transitory computer readable storage medium of claim 24, wherein the instructions, when executed further cause the at least one machine to compare gesture data generated based on data collected by the on-body sensor to known gesture data to generate pre-processed gesture data and generate the audio output based on the pre-processed gesture data.

26. The non-transitory computer readable storage medium of claim 25, wherein the instructions, when executed, further cause the at least one machine to map the gesture data to known gesture data for the virtual instrument.

27. A non-transitory computer readable storage medium comprising instructions that, when executed, cause at least one machine to at least:

detect, based on outputs of at least one of: (i) an on-body sensor and an RF local triangulation system, or (ii) an off-body sensor and the RF local triangulation system, at least one of a position or a movement of a body part of a user interacting with a virtual instrument;

generate an audio output of the virtual instrument corresponding to the at least one of the position or the movement; and determine the at least one of the position or the movement of the body part of the user relative to a stage on which the user interacts with the virtual instrument based on position data generated by the RF local triangulation system.

28. The non-transitory computer readable storage medium of claim 20, wherein the instructions, when executed, further cause the at least one machine to generate a visual output in response to at least one of the position or the movement.

29. The non-transitory computer readable storage medium of claim 28, wherein the visual output includes a visualization of the at least one of the position or the movement of the body part of the user relative to the virtual instrument.

30. The non-transitory computer readable storage medium of claim 20, wherein the instructions, when executed, further cause the at least one machine to generate a special effect based on the audio output.

31. The non-transitory computer readable storage medium of claim 30, wherein the special effect is a lighting effect.

32. The non-transitory computer readable storage medium of claim 20, wherein the audio output is to include one or more of (a) a musical note in response to at least one of the movement or the body part being in the first positional zone or the second positional zone, (b) a volume level in response to the movement, or (c) an audio pitch in response to the movement.

33. The non-transitory computer readable storage medium of claim 20, wherein the instructions, when executed, further cause the at least one machine to cause one or more of (a) the on-body sensor to generate gesture data with respect to at least one of the position or the movement of the body part, (b) the off-body sensor to generate image data with respect to at least one of the position or the movement of the body part, and (c) the RF local triangulation system to generate position data with respect to at least one or the position or the movement of the body part.

* * * * *